UNITED STATES PATENT OFFICE 2,332,949

PROCESS FOR MAKING ALDOL

Ladislas Szlatinay, Budapest, Hungary; vested in the Alien Property Custodian

No Drawing. Application January 18, 1941, Serial No. 375,015. In Hungary January 26, 1940

3 Claims. (Cl. 260—602)

There are known several processes for making aldol from acetaldehyde, based on the knowledge that acetaldehyde in an alkaline medium is converted into aldol. With these processes, either a strong alkali such as sodium hydroxide or some salt or compound of weaker alkalinity such as sodium carbonate, strontium oxide, calcium oxide, etc. has been used. The use of a strong alkali has, however, the disadvantage that the reaction starts quickly, the acetaldehyde easily and suddenly boils, during which a great part of it evaporates, while another part is converted into a thick, even hard aldol resin poly-aldol, which is unsuitable for further synthesis. Even if the sodium hydroxide is added with the greatest care and only with a very small surplus, even then we shall obtain a relatively great quantity of such poly-aldol which is of no use for further synthesis. If a weak alkaline medium is used, conversion will be very slow, but even then it may happen that the aldol formed at the start of the reaction polymerises into poly-aldol before the remaining acetaldehyde is converted in the course of the reaction.

Two problems must therefore be solved for making good quality aldol. On the one hand, I had by slowing down the reaction and by conducting it cautiously to prevent the boiling of the acetaldehyde before time, on the other hand it had to be prevented to let the acetaldehyde once converted into monoaldol polymerise.

I have found that both the regulation of the course of the reaction and the prevention of the polymerisation of the aldol can be attained, if I add to the reaction mixture while making the aldol polyvalent phenols, such as hydroquinon, pyrogallol, etc. It has been known that such polyvalent phenols are compounds preventing polymerisation, they are so-called inhibitors and have already been used in the past, to prevent further polymerisation mainly of the ready made styrol-polymerisates while these are standing. Owing to their strong stabilising effect, however, they have hitherto not been used in connection with the making of aldol, since it was presumed that due to this feature the same would prevent the conversion of acetaldehyde into aldol. Against this I have found that for example the addition of hydroquinon does not prejudice the condensation process, but it furthers the uniform course of the reaction and wholly prevents the aldol becoming resinous while the same is made from acetaldehyde.

Having now particularly described and ascertained the nature of my said invention and in what manner the same is to be performed, I declare that I claim as:

1. Process for making aldol from acetaldehyde in an alkaline medium which includes the step of adding a polyvalent phenol to the reaction mixture during condensation.

2. Process according to claim 1, in which the polyvalent phenol is hydroquinon.

3. Process according to claim 1, in which the polyvalent phenol is pyrogallol.

LADISLAS SZLATINAY.